United States Patent
Shemkunas et al.

(10) Patent No.: US 11,084,569 B2
(45) Date of Patent: Aug. 10, 2021

(54) FRICTION STIR WELDED MONOLITHIC AIRCRAFT STRUCTURE AND METHOD

(71) Applicant: The Boeing Company, Chicago, IL (US)

(72) Inventors: Michael P. Shemkunas, Mukilteo, WA (US); Lisa G. Schleuter, Mukilteo, WA (US); Bruce A. Dahl, Kent, WA (US); Alain A. Adjorlolo, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 316 days.

(21) Appl. No.: 16/135,777

(22) Filed: Sep. 19, 2018

(65) Prior Publication Data

US 2020/0086975 A1   Mar. 19, 2020

(51) Int. Cl.
*B64C 9/32* (2006.01)
*B64F 5/10* (2017.01)
(Continued)

(52) U.S. Cl.
CPC ............ *B64C 9/323* (2013.01); *B23K 20/129* (2013.01); *B23K 20/2336* (2013.01); *B64C 3/26* (2013.01);
(Continued)

(58) Field of Classification Search
CPC ....... B64C 9/323; B64C 3/26; B23K 20/1295; B23K 20/1265; B64F 5/10
See application file for complete search history.

(56) References Cited

U.S. PATENT DOCUMENTS 6,779,707 B2 *   8/2004   Dracup .............. B23K 20/1255
                                                228/112.1
7,500,640 B2 *   3/2009   Tanaka ................. B23K 20/122
                                                244/123.7
(Continued)

FOREIGN PATENT DOCUMENTS

EP         3269632 A1   1/2018
EP         3309059 A1   4/2018
JP         2003266184 A  9/2003

OTHER PUBLICATIONS

Photos taken at Shinmaywa Exhibit, 2018 Farnborough Airshow, Jul. 16-22, 2018.
(Continued)

*Primary Examiner* — Brian M O'Hara
(74) *Attorney, Agent, or Firm* — Miller, Matthias & Hull LLP (57) ABSTRACT

A method of forming a monolithic aircraft structure having multiple aerodynamic surfaces includes forming a body component to have a body skin defining a body skin outer surface, and a body side wall integrally formed with the body skin and defining a body mating surface, the body skin outer surface providing a first aerodynamic surface. A cover component is formed to have a cover mating surface and a cover outer surface opposite the cover mating surface, the cover outer surface defining a second aerodynamic surface. The body component is positioned relative to the cover component so that the body mating surface engages the cover mating surface. At least portions of the cover mating surface are friction stir welded to the body mating surface to form friction stir welded joints between the body component and the cover component.

20 Claims, 7 Drawing Sheets

(51) Int. Cl.
  *B23K 20/12* (2006.01)
  *B23K 20/233* (2006.01)
  *B64C 3/26* (2006.01)
  *B64C 9/02* (2006.01)
  *B23K 103/10* (2006.01)
  *B23K 101/00* (2006.01)

(52) U.S. Cl.
  CPC ............... *B64C 9/02* (2013.01); *B64F 5/10* (2017.01); *B23K 2101/006* (2018.08); *B23K 2103/10* (2018.08)

(56) References Cited

U.S. PATENT DOCUMENTS

| | | | |
|---|---|---|---|
| 8,091,828 B2 * | 1/2012 | Van Der Veen | ........ B64C 3/185 244/117 R |
| 8,561,877 B2 * | 10/2013 | Carlson | ................. B62D 27/02 228/112.1 |
| 8,939,495 B2 | 1/2015 | Kurata | |
| 9,266,191 B2 * | 2/2016 | Kandasamy | ....... B23K 20/1295 |
| 2005/0247756 A1 * | 11/2005 | Frazer | ....................... B64C 3/26 228/101 |
| 2006/0175468 A1 | 8/2006 | Huynh et al. | |
| 2008/0265094 A1 | 10/2008 | Van Der Veen et al. | |
| 2010/0239813 A1 | 9/2010 | Fujita et al. | |
| 2013/0252013 A1 | 9/2013 | Kermarrec et al. | |
| 2016/0176507 A1 | 6/2016 | Fevergeon et al. | |
| 2016/0362172 A1 * | 12/2016 | Axford | .................... B64C 9/323 |
| 2017/0259908 A1 | 9/2017 | Omeara et al. | |
| 2018/0015996 A1 | 1/2018 | Shemkunas et al. | |
| 2018/0043464 A1 | 2/2018 | Litwinski | |
| 2018/0099736 A1 * | 4/2018 | Kordel | .................... B64C 3/187 |
| 2020/0086975 A1 * | 3/2020 | Shemkunas | ........ B23K 20/2336 |
| 2021/0053668 A1 * | 2/2021 | Gruner | ................. B23K 20/122 |

OTHER PUBLICATIONS

Extended Search Report for related European Application No. 19198077.0; report dated Feb. 20, 2020.

\* cited by examiner

FRICTION STIR WELDED MONOLITHIC AIRCRAFT STRUCTURE AND METHOD

TECHNICAL FIELD

The present disclosure generally relates to monolithic aircraft structures and methods and, more specifically, to friction stir welded monolithic aircraft structures having multiple aerodynamic surfaces and methods of forming such structures.

BACKGROUND

Structures used on aircraft may have aerodynamic surfaces (i.e., control surfaces) that are exposed to ambient air during flight. These structures may be formed of two or more components that are joined together. An aircraft spoiler, for example, typically includes multiple components that are fastened or bonded together to form the complete spoiler. One configuration of a spoiler is a monolithic, machined upper component with a lower cover attached for aerodynamic purposes. The upper component has an outer surface facing away from the aircraft wing that is continuously exposed to ambient air during flight. The cover also has an outer surface that typically overlies a flap of the aircraft when in a neutral position, but may move to a deployed position in which the outer surface of the cover is spaced from the flap. Traditional methods of joining such components, such as bolting, require additional labor and expense, add to the weight of the aircraft, and introduce aerodynamic drag.

SUMMARY

In accordance with one example, a method is provided of forming a monolithic aircraft structure having multiple aerodynamic surfaces. The method includes forming a body component to have a body skin defining a body skin outer surface, and a body side wall integrally formed with the body skin and defining a body mating surface, the body skin outer surface providing a first aerodynamic surface. A cover component is formed to have a cover mating surface and a cover outer surface opposite the cover mating surface, the cover outer surface defining a second aerodynamic surface. The body component is positioned relative to the cover component so that the body mating surface engages the cover mating surface. At least portions of the cover mating surface are friction stir welded to the body mating surface to form friction stir welded joints between the body component and the cover component.

In accordance with another example, a monolithic aircraft structure includes a body component having a body skin with a body skin outer surface defining a first aerodynamic surface, and a body side wall integrally formed with the body skin and defining a body mating surface. A cover component has a cover mating surface and a cover outer surface opposite the cover mating surface, wherein the cover mating surface is shaped conformally with the body mating surface, and wherein the cover outer surface defines a second aerodynamic surface. At least one friction stir welded joint extends through the cover mating surface of the cover component and into the body mating surface of the body component.

In accordance with yet another example, an aircraft spoiler includes a body component having a body skin with a body skin outer surface defining a first aerodynamic surface, a body side wall integrally formed with the body skin and defining a body mating surface, the body side wall including generally triangular first and second side panels joined by a rear panel, and at least one stiffener integrally formed with the body skin and the body side wall and disposed between the first and second side panels, the at least one stiffener defining a stiffener mating surface. A cover component has a cover mating surface and a cover outer surface opposite the cover mating surface, wherein the cover mating surface is shaped conformally with the body mating surface and the stiffener mating surface, the cover outer surface defining a second aerodynamic surface. At least one friction stir welded joint extends through the cover mating surface of the cover component and into the body mating surface of the body component, and at least one additional friction stir welded joint extending through the cover mating surface of the cover component and into the stiffener mating surface of the at least one stiffener.

In another aspect of the disclosure that may be combined with any of these aspects, the body component further comprises at least one stiffener integrally formed with the body skin and the body side wall and defining a stiffener mating surface, and the method further comprising friction stir welding at least a portion of the stiffener mating surface to the cover mating surface to form an additional friction stir welded joint between the body component and the cover component.

In another aspect of the disclosure that may be combined with any of these aspects, the at least one stiffener comprises a boss forming a portion of the stiffener mating surface, and in which the boss is friction stir welded to the cover mating surface to form the additional friction stir welded joint.

In another aspect of the disclosure that may be combined with any of these aspects, forming the cover component further comprises forming a socket sized to receive a portion of the boss.

In another aspect of the disclosure that may be combined with any of these aspects, friction stir welding at least a portion of the stiffener mating surface to the cover mating surface comprises friction stir welding continuously along an entirety of the stiffener mating surface to the cover mating surface.

In another aspect of the disclosure that may be combined with any of these aspects, the method further comprises, subsequent to friction stir welding at least portions of the cover mating surface to the body mating surface to form the friction stir welded joints, heat treating the body component and the cover component.

In another aspect of the disclosure that may be combined with any of these aspects, the method further comprises, subsequent to friction stir welding at least portions of the cover mating surface to the body mating surface to form the friction stir welded joints, performing non-destructive inspection of the friction stir welded joints between the body component and the cover component.

In another aspect of the disclosure that may be combined with any of these aspects, the method further comprises, subsequent to friction stir welding at least portions of the cover mating surface to the body mating surface to form the friction stir welded joints, applying at least one surface treatment selected from a group of surface treatments consisting of anodizing, primer coating, and topcoating to the body skin outer surface and the cover outer surface.

In another aspect of the disclosure that may be combined with any of these aspects, forming the body component comprises machining the body component from a block of aluminum alloy material.

In another aspect of the disclosure that may be combined with any of these aspects, forming the cover component comprises machining the cover component from a sheet of aluminum alloy material.

In another aspect of the disclosure that may be combined with any of these aspects, forming the body component comprises forming a spoiler body, and forming the cover component comprises forming a spoiler cover.

In another aspect of the disclosure that may be combined with any of these aspects, forming the spoiler body further includes forming fittings integrally with the body skin and body side wall.

In another aspect of the disclosure that may be combined with any of these aspects, the body component further comprises at least one stiffener integrally formed with the body skin and the body side wall and defining a stiffener mating surface, and further comprising at least one additional friction stir welded joint extending through the cover mating surface of the cover component and into the stiffener mating surface of the at least one stiffener.

In another aspect of the disclosure that may be combined with any of these aspects, the at least one stiffener comprises a boss forming a portion of the stiffener mating surface, and in which the at least one additional friction stir welded joint is formed between the cover mating surface of the cover component and the boss of the at least one stiffener.

In another aspect of the disclosure that may be combined with any of these aspects, the cover component further includes a socket sized to receive a portion of the boss.

In another aspect of the disclosure that may be combined with any of these aspects, the at least one additional friction stir welded joint comprises a continuous friction stir welded joint extending along an entirety of the stiffener mating surface These and other aspects and features will become more readily apparent upon reading the following detailed description when taken in conjunction with the accompanying drawings. In addition, although various features are disclosed in relation to specific examples, it is understood that the various features may be combined with each other, or used alone, with any of the various examples without departing from the scope of the disclosure.

It should be understood that the drawings are not necessarily drawn to scale and that the disclosed examples are sometimes illustrated schematically. It is to be further appreciated that the following detailed description is merely exemplary in nature and is not intended to limit the disclosure or the application and uses thereof. Hence, although the present disclosure is, for convenience of explanation, depicted and described as certain illustrative examples, it will be appreciated that it can be implemented in various other types of examples and in various other systems and environments.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Monolithic aircraft structures having multiple aerodynamic surfaces, and methods for forming such structures, are disclosed herein having reduced weight and aerodynamic drag. An exemplary aircraft structure includes a body component defining a first aerodynamic surface, and a cover component defining a second aerodynamic surface. The body component and cover component are joined by friction stir welding to form a monolithic structure. The friction stir weld may be continuous or intermittent about a perimeter of the body and cover components. Additional friction stir welds may be used between the cover component and optional stiffeners provided with the body component, and again may be continuous or intermittent along the stiffeners. Joining the body and cover components using friction stir welds avoids the assembly expense, weight, and aerodynamic drag associated with the use of fasteners.

As used in the examples disclosed herein, the terms "aerodynamic surface" and "control surface" are used interchangeably to refer to a component and/or a surface that defines an aerodynamic flow surface used to control flight and/or navigation of an aircraft or other vehicle based on fluid flow (e.g., airflow during movement and/or flight). For example, the term "control surface" may encompass a surface of an aerodynamic structure (e.g., a top surface of a flap) or an actively displaced and/or rotated component such as a flap, spoiler or aileron, for example. As used herein, the term "a chord length" refers to a length along a flow path or airflow direction along a direction of travel of an aircraft, unless described otherwise. As used herein the term "angle from horizontal" of an aircraft refers to an angle and/or relative angles corresponding to a reference plane defined as an angle away from a neutral position of a control surface, whereas the term "horizontal" in this context refers to the neutral position and/or angle of the control surface. As used herein, the term "upper surface" refers to a top surface (e.g., a wing top surface) of an aircraft on opposite side from landing gear of the aircraft while the term "lower surface" refers to a bottom surface side (e.g., a wing bottom surface) that corresponds to the landing gear.

Figure 1:
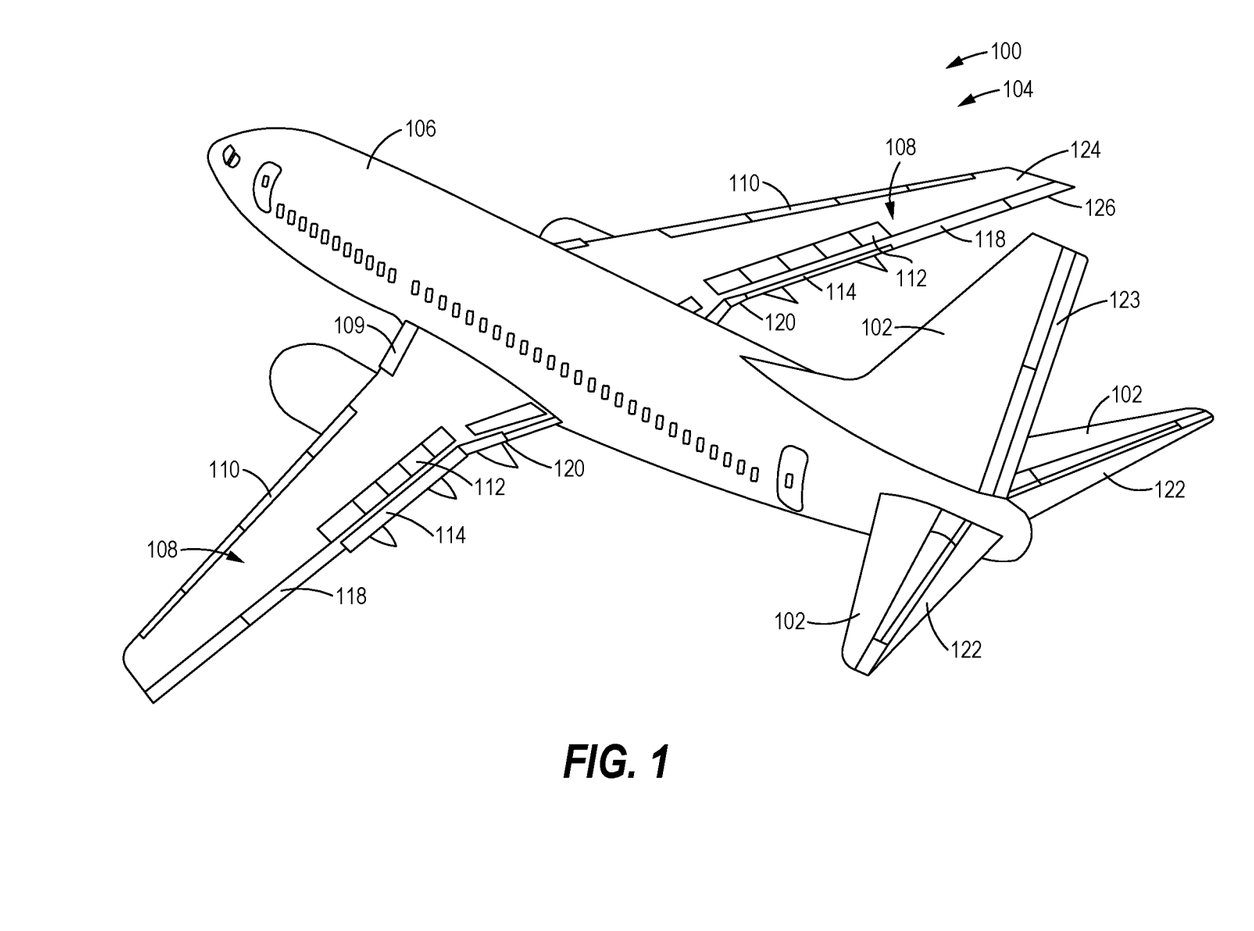
FIG. 1 is a perspective view of an example aircraft that may be used to implement example methods and apparatus disclosed herein.

FIG. 1 illustrates an example aircraft 100 in which the examples disclosed herein may be implemented. In the illustrated example, the aircraft 100 includes stabilizers 102 and wings 104 attached to a fuselage 106. The wings 104 of the illustrated example have control surfaces (e.g., flaps, ailerons, spoilers, tabs, etc.) 108, some of which are located at a trailing edge of the wings 104 and may be displaced or adjusted (e.g., angled, etc.) to provide lift during takeoff, landing and/or flight maneuvers. In some examples, the control surfaces 108 are operated (i.e., displaced) independently of one another. The control surfaces 108 include leading edge flaps 109, leading edge slats 110, upper surface spoilers (e.g., flight spoilers, ground spoilers, upper surface spoilers, etc.) 112, and trailing edge flaps (e.g., rotatable flaps) 114. The control surfaces 108 of the illustrated example also include ailerons 118 and flaperons 120. In this example, the stabilizers 102 include elevators 122 and a rudder 123. The wings 104 also define upper and lower surfaces (e.g., upper and lower sides, upper and lower aerodynamic surfaces, etc.) 124, 126, respectively.

To control flight of the aircraft 100, the upper surface spoilers 112 of the illustrated example alter the lift and drag of the aircraft 100. The rotatable flaps 114 alter the lift and pitch of the aircraft 100. The flaperons 120 and the ailerons 118 of the illustrated example alter the roll of the aircraft 100. In this example, the edge slats 110 alter the lift of the aircraft 100. The control surfaces 108 of the illustrated example also play a role in controlling the speed of the aircraft 100. For example, the upper surface spoilers 112 may be used for braking of the aircraft 100. Any of the control surfaces 108 of the illustrated example may be independently moved (e.g., deflected) to control the load distribution in different directions over the wing 104, thereby directing movement of the aircraft 100.

The examples described herein may be applied to control surfaces associated with any of the stabilizers 102, the wings 104 and/or any other exterior or outboard structure (e.g., a horizontal stabilizer, a wing strut, an engine strut, a canard stabilizer, etc.) of the aircraft 100. In particular, the wings 104 and/or the stabilizers 102 may have control surfaces 108 that can be adjusted to maneuver the aircraft 100 and/or control a speed of the aircraft 100, for example. Additionally or alternatively, in some examples, the fuselage 106 has control surfaces, which may be deflected, to alter the flight maneuvering characteristics during cruise and/or takeoff of the aircraft 100.

Figure 2:
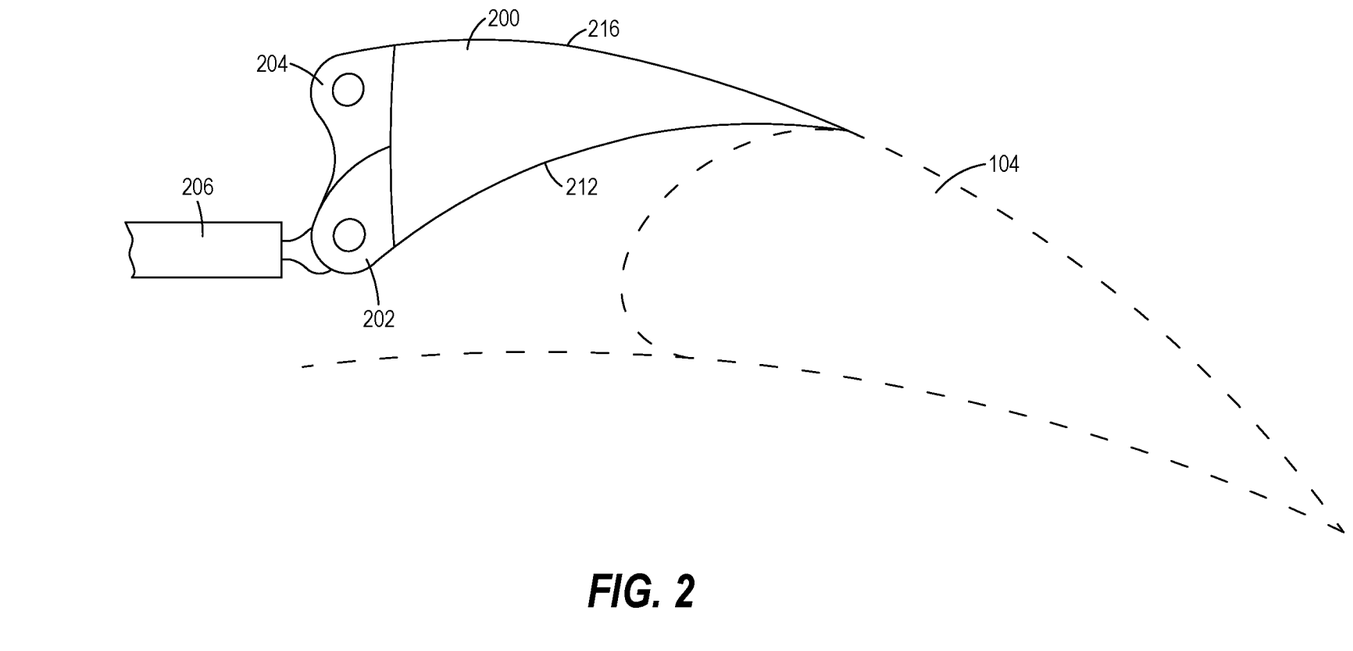
FIG. 2 is a side elevation view, in cross-section, of a wing of the aircraft taken along line 2-2 of FIG. 1.

FIG. 2 illustrates a monolithic aircraft structure in the form of a spoiler 200 provided on the wing 104 of the aircraft 100. The spoiler 200 may have a neutral position, as shown in FIG. 2, in which the spoiler overlies a wing 104 of the aircraft 100. The spoiler 200, however, may be rotated from the neutral position to alter an aerodynamic characteristic of the aircraft, such as lift, in a controlled manner. The spoiler 200 includes fittings, such as lugs 202, 204, with lug 202 configured for attachment to an actuator 206. The actuator 206 may operate to move the spoiler 200 from the neutral position.

Figure 3:
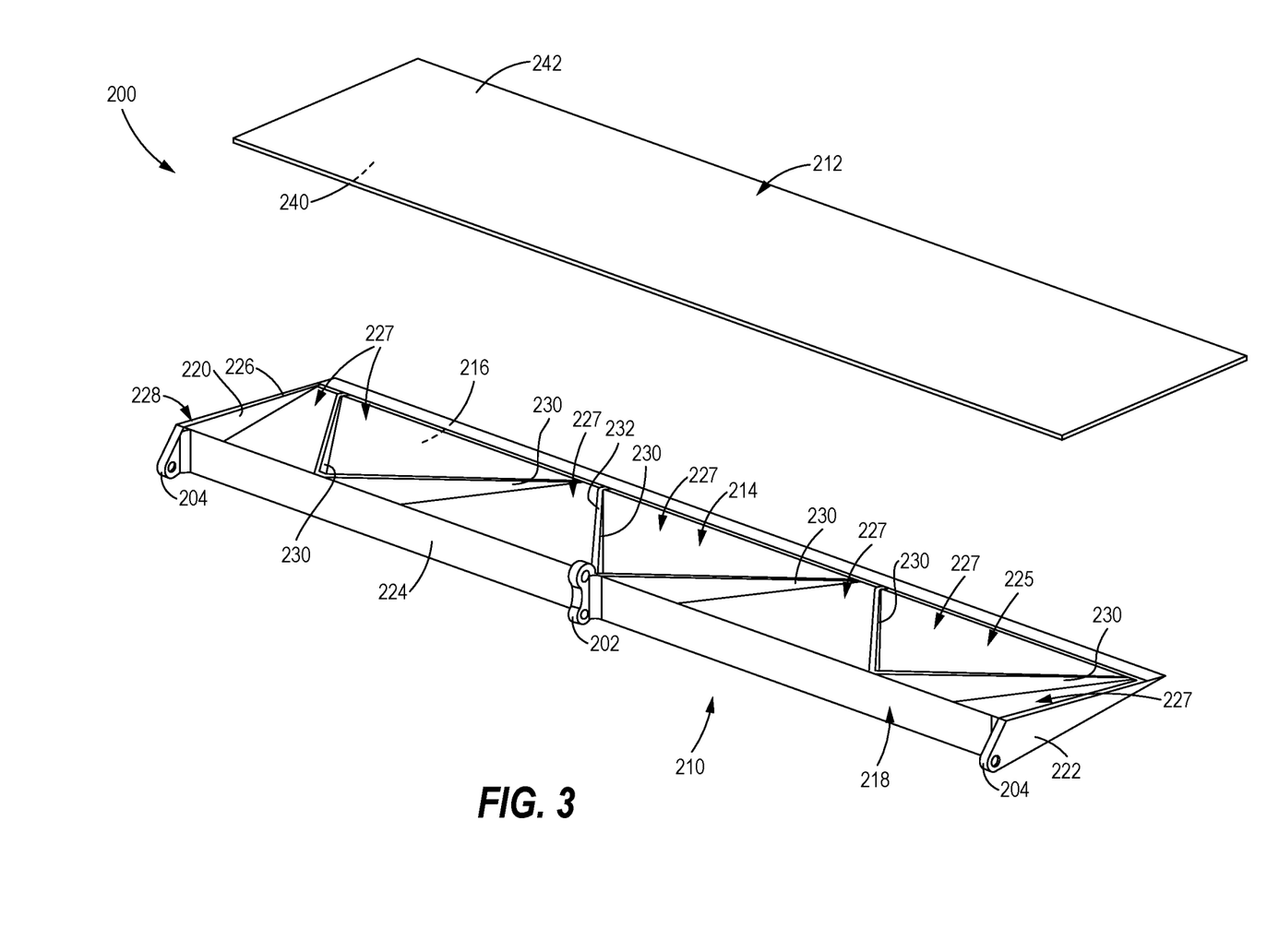
FIG. 3 is an exploded view, in perspective, of a spoiler used on the wing of FIG. 2, showing a body component and a cover component.

FIG. 3 provides an exploded view of the spoiler 200. The spoiler 200 generally includes a body component 210 and a cover component 212. The body component 210 generally defines the overall shape of the spoiler 200, and includes a body skin 214 having a body skin outer surface 216. The body skin outer surface 216 is directly exposed to ambient air during flight of the aircraft 100, and therefore provides a first aerodynamic surface of the spoiler 200. That is, a position of the body skin outer surface 216 may be controlled to affect one or more aerodynamic characteristics of the wing 104, such as magnitude of lift. The body component 210 further includes a body side wall 218 integrally formed with and extending away from the body skin 214. In the illustrated example, the body side wall 218 includes generally triangular first and second side panels 220, 222 joined by a rear panel 224. The body skin 214 and integral body side wall 218 define a cavity 225. While the shape of the side panels 220, 222 in the illustrated example give the spoiler 200 an overall shape resembling a triangular wedge, it will be appreciated that the side panels 220, 222 may have other shapes to give the spoiler 200, or other monolithic aircraft component, a different overall shape. Furthermore, the body side wall 218 may include additional panels, such as a front panel, to further alter the overall shape of the spoiler 200.

The body side wall 218 further defines a body mating surface 226 to facilitate joining of the body component 210 with the cover component 212. In the example illustrated at FIG. 3, the body mating surface 226 extends around a perimeter of a bottom side 228 of the body component 210. The body mating surface 226 may be substantially planar as shown to conform to the cover component 212, as discussed more fully below. Accordingly, in the illustrated example, the body mating surface 226 appears as a relatively narrow strip extending around a perimeter of the bottom side 228 of the body component 210.

The body component 210 may further include stiffeners 230 disposed between the side panels 220, 222 of the body side wall 218, thereby to improve the structural strength of the assembled aircraft structure. As best shown in FIG. 3, the body component 210 includes six stiffeners 230 that are integrally formed with the body skin 214 and the body side wall 218, although a different number of stiffeners 230 may be used without departing from the scope of this disclosure. The stiffeners 230 divide the cavity 225 into sub-cavities 227. Each stiffener 230 may have a shape that conforms to a cross-sectional shape of the body component 210, such as a triangular shape as illustrated. At least one of the stiffeners 230 may further have a top edge defining a stiffener mating surface 232. The stiffener mating surface 232 may be disposed in the same plane as the body mating surface 226 of the body side wall 218. In some examples, the body component 210 may be formed from a block of material, such as aluminum alloy, that is machined to form the body skin 214, body side wall 218, lugs 202, 204, and stiffeners 230.

The cover component 212 is shaped to closely overlie the bottom side 228 of the body component 210, thereby to enclose the cavity 225. In the illustrated example showing the spoiler 200, the cover component 212 is formed as a sheet having a substantially uniform thickness. The cover component 212 includes a cover mating surface 240 which is oriented to face toward the body component 210 during assembly, and a cover outer surface 242 opposite the cover mating surface 240 and defining a second aerodynamic surface of the spoiler 200. The cover mating surface 240 is shaped to conform to the body mating surface 226 of the body component 210. Additionally, the cover mating surface 240 may be further shaped to conform to the stiffener mating surface 232, if provided. In some examples, the cover component 212 is machined from a sheet of aluminum alloy.

Figure 4:
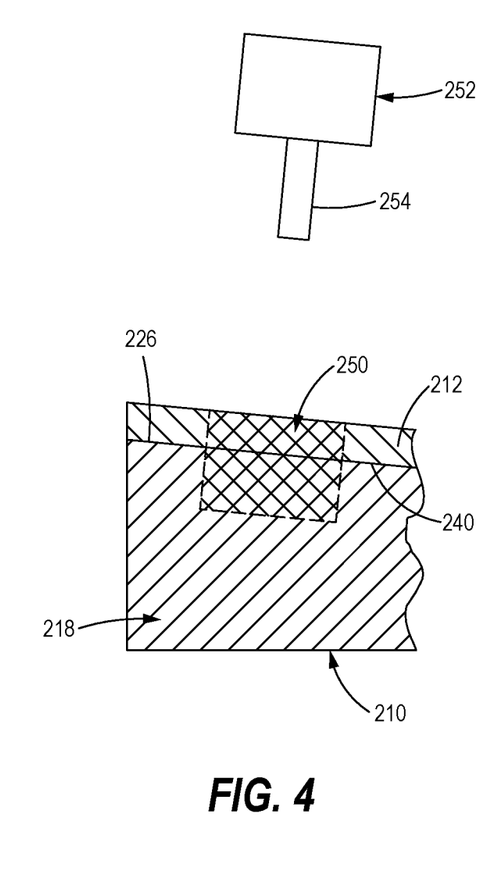
FIG. 4 is a side elevation view, in cross-section, of a friction stir welded joint formed in the spoiler of FIG. 3.

The body component 210 and cover component 212 are joined together by at least one friction stir welded joint 250 to form a monolithic aircraft structure. As best shown in FIG. 4, the friction stir welded joint 250 may be formed by a friction stir welding tool 252 having a pin 254. During the friction stir welding process, the pin 254 of the friction stir welding tool 252 is rotated and forced through the cover component 212 and into the body mating surface 226 of the body component 210. Heat and pressure generated by the friction stir welding tool 252 mechanically intermixes portions of the body component 210 and the cover component 212 to form the friction stir welded joint 250. In the illustrated example, the friction stir welded joint 250 extends through the cover component 212 and portions of the body component 210. The friction stir welded joint 250 may extend continuously along the entire body mating surface 226, or multiple friction stir welded joints 250 may be formed intermittently along the body mating surface 226.

Figure 5:
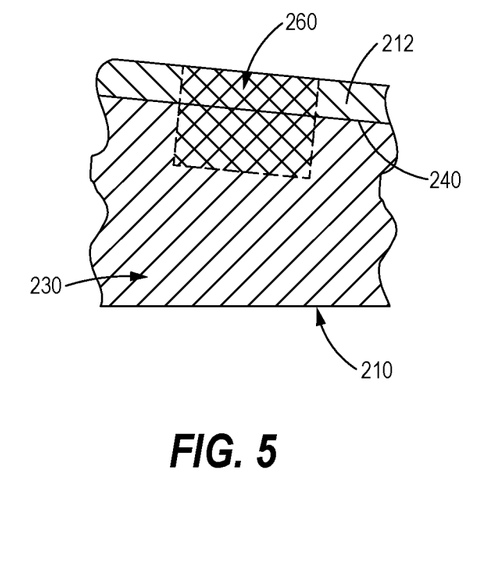
FIG. 5 is a side elevation view, in cross-section, of an additional friction stir welded joint formed in the spoiler of FIG. 3.

The body component 210 and cover component 212 also may be joined by at least one additional friction stir welded joint 260, to more securely join the body component 210 to the cover component 212 and further improve the structural integrity of the resulting, monolithic spoiler structure. More specifically, the additional friction stir welded joint 260 may be formed through the cover mating surface 240 of the cover component 212 and the stiffener mating surface 232 provided on at least one of the stiffeners 230 formed integrally with the body component 210, as best shown in FIG. 5.

Figure 6:
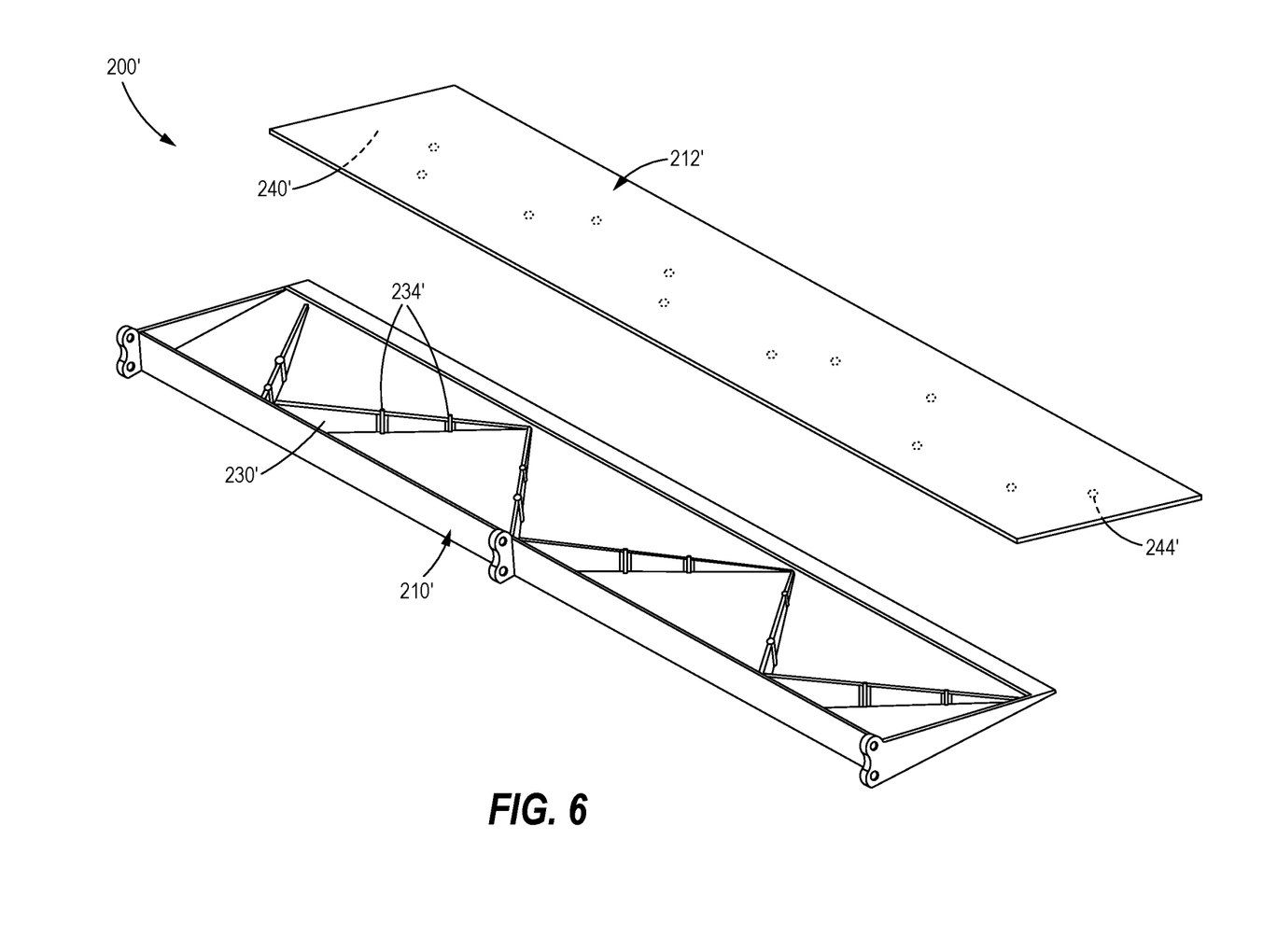
FIG. 6 is an exploded view, in perspective, of an alternative example of a spoiler used on the wing of FIG. 2 showing alternative body and cover components.
Figure 7:
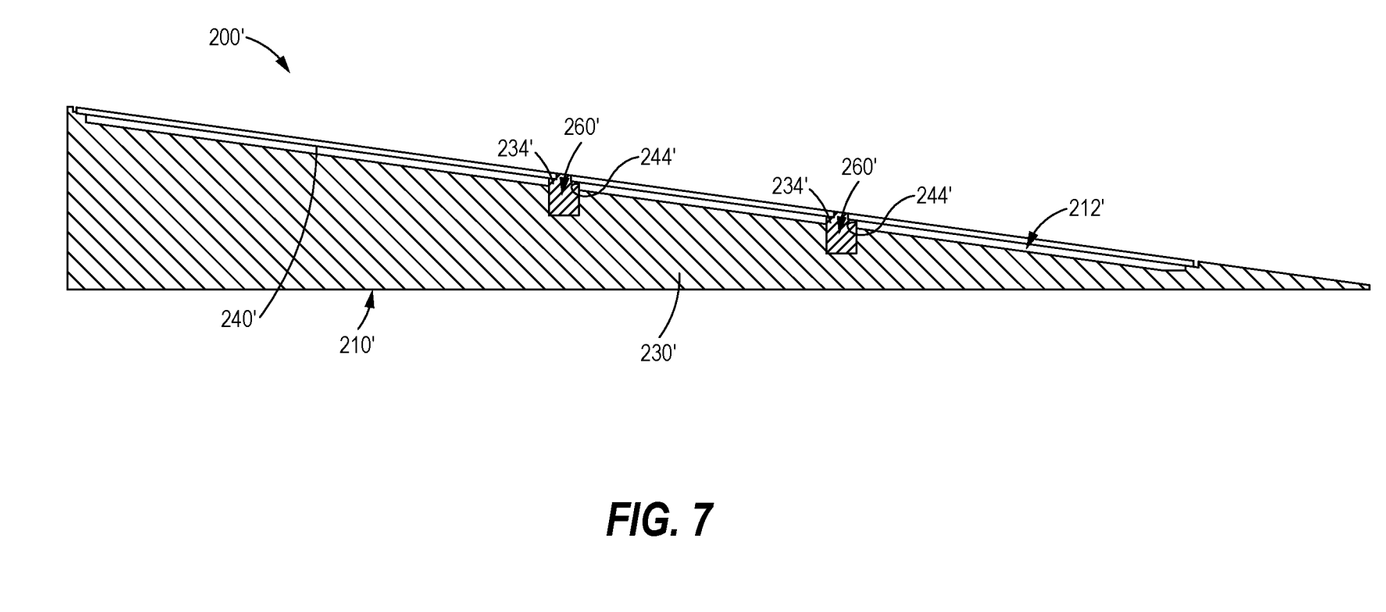
FIG. 7 is a side elevation view, in cross-section, of a friction stir welded joint formed in the spoiler of FIG. 6.

An alternative example of a spoiler 200' is illustrated at FIGS. 6 and 7. The spoiler 200' is similar to the spoiler 200 described above, but includes a body component 210' having stiffeners 230' with bosses 234', and a cover component 212' having a cover mating surface 240' formed with sockets 244' sized to receive the bosses 234', as described in greater detail below.

As best shown at FIG. 6, the stiffeners 230' of the body component 210' include localized portions of increased thickness having a generally cylindrical shape, thereby to form bosses 234'. Each stiffener 230' is shown having two bosses 234', however a different number of bosses 234' may be provided on each stiffener 230'. Furthermore, while each stiffener 230' is shown having the same number of bosses 234', it will be appreciated that the stiffeners 230' may have different numbers of bosses 234' or may be provided without any boss 234'. Furthermore, the bosses 234' may project slightly above the stiffener 230' in which it is formed.

The cover component 212' may include the sockets 244' to positively position the cover component 212' relative to the body component 210' during assembly. Accordingly, as best shown in FIG. 6, the cover component 212' includes a socket 244' associated with each boss 234' provided with the body component 210'. When the cover component 212' is placed on top of the body component 210' as shown in FIG. 7, friction stir welded joints 260' may be formed through each socket 244' and associated boss 234'. Accordingly, the bosses 234' provide additional material with which to form the friction stir welded joints 260', thereby more securely joining the cover component 212' to the body component 210'.

Figure 8:
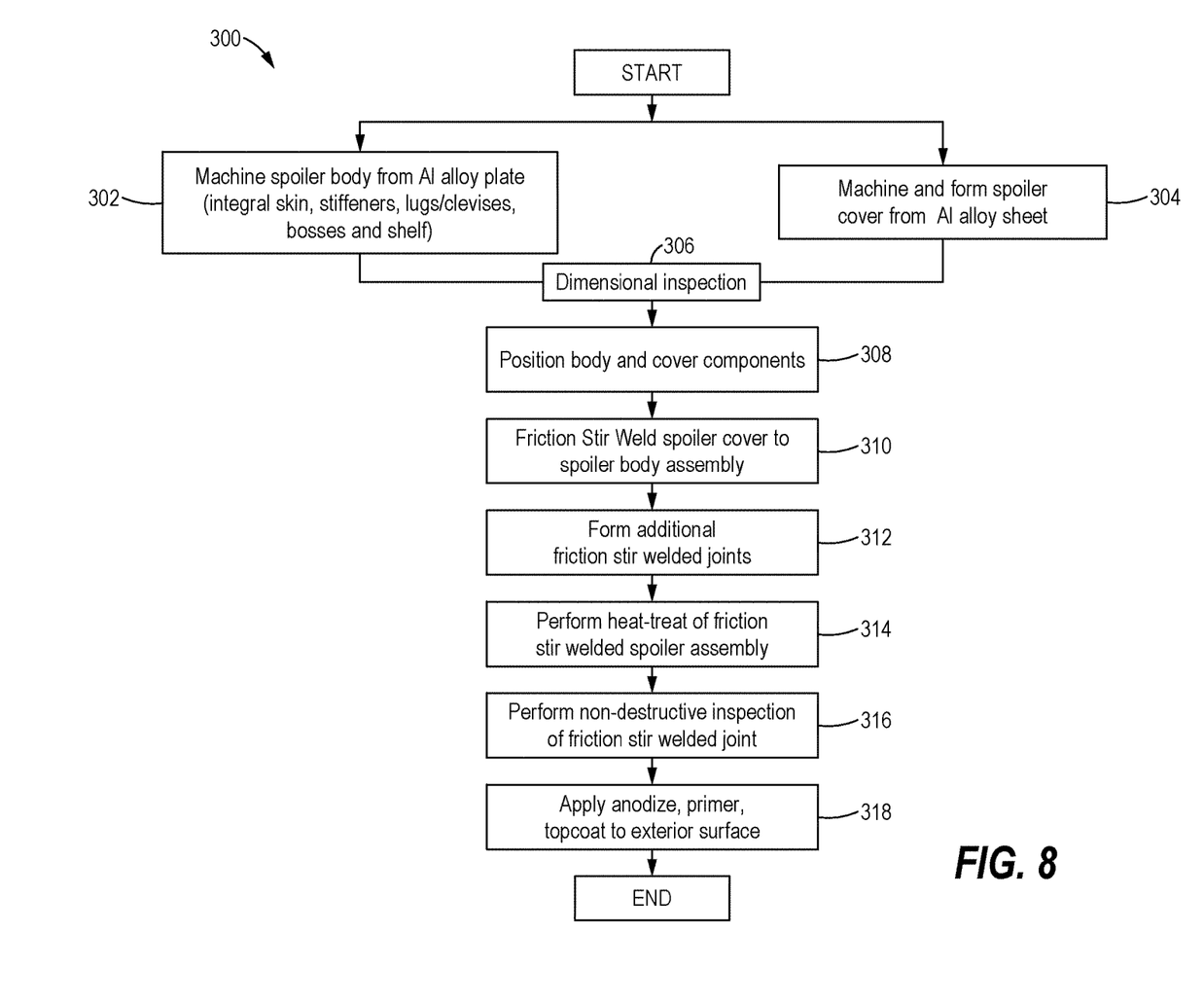
FIG. 8 is a schematic flowchart illustrating a method of forming a monolithic aircraft structure having multiple aerodynamic surfaces, according to the present disclosure.

FIG. 8 schematically illustrates a method 300 of forming a monolithic aircraft structure having multiple aerodynamic surfaces. The method begins at block 302 by forming a body component 210 having integral body skin 214 having a body skin outer surface 216 defining a first aerodynamic surface, body side wall 218, and, optionally, stiffeners 230, lugs 202, 204, and bosses 234'. The body component 210 may be machined from a plate of aluminum alloy. At block 304, a cover component 212 is formed having to have a cover mating surface 240 and a cover outer surface 242 defining a second aerodynamic surface. The cover component 212 may be formed from a sheet of aluminum alloy. The method 300 may optionally include a dimensional inspection of the body component 210 and the cover component 212 at block 306, to ensure that the components meet the desired size specifications.

At block 308, the method may continue by positioning the body component 210 relative to the cover component 212 so that the body mating surface 226 engages the cover mating surface 240. Continuing at block 310, the method includes friction stir welding at least portions of the cover mating surface 240 to the body mating surface 226 to form friction stir welded joints 250 between the body component 210 and the cover component 212, thereby to form a monolithic aircraft structure. Optionally, at block 312, the method may include forming additional friction stir welded joints 260 between the cover mating surface 240 and at least one stiffener 230, if provided. It will be appreciated that, in some examples, the friction stir welded joints 250 and the additional friction stir welded joints 260 are formed by inserting the friction stir welding tool 252 through the aerodynamic surface defined by the cover outer surface 242 of the cover component 212. While conventional welding or other joining processes may introduce drag, and therefore their use on an aerodynamic surface are typically avoided, formation of the friction stir welded joints 250 and additional friction stir welded joints 260 leaves a relatively smooth outer surface, thereby minimizing drag introduced by the component joining process. Furthermore, the friction stir welding process causes portions of the body component 210 and cover component 212 to be intermixed, resulting in a more permanently joined, monolithic structure.

The method 300 may include several optional steps after the friction stir welded joints 250 and the additional friction stir welded joints 260 are formed. For example, at block 314, the assembled body component 210 and cover component 212 are heat treated to improve structural integrity of the spoiler 200. At block 316, non-destructive inspection of the friction stir welded joints 250 and the additional friction stir welded joints 260 is performed to ensure that the spoiler 200 is structurally sound. Finally, at block 318, at least one surface treatment selected from a group of surface treatments consisting of anodizing, primer coating, and topcoating is applied to the body skin outer surface 216 and the cover outer surface 242, thereby to improve aerodynamic qualities of the spoiler 200, such as reducing drag over the aerodynamic surfaces.

All references, including publications, patent applications, and patents, cited herein are hereby incorporated by reference. All methods described herein can be performed in any suitable order unless otherwise indicated herein or otherwise clearly contradicted by context. The use of any and all examples, or exemplary language (e.g., "such as") provided herein, is intended to illuminate the disclosed subject matter and does not pose a limitation on the scope of the claims. Any statement herein as to the nature or benefits of the exemplary examples is not intended to be limiting, and the appended claims should not be deemed to be limited by such statements. More generally, no language in the specification should be construed as indicating any non-claimed element as being essential to the practice of the claimed subject matter. The scope of the claims includes all modifications and equivalents of the subject matter recited therein as permitted by applicable law. Moreover, any combination of the above-described elements in all possible variations thereof is encompassed by the claims unless otherwise indicated herein or otherwise clearly contradicted by context. Additionally, aspects of the different examples can be combined with or substituted for one another. Finally, the description herein of any reference or patent, even if identified as "prior," is not intended to constitute a concession that such reference or patent is available as prior art against the present disclosure.

What is claimed is:

1. A method of forming a monolithic aircraft structure, comprising multiple aerodynamic surfaces, the method comprising steps of:

forming a body component, comprising a bottom side, a body skin, defining a body skin outer surface opposite the bottom side of the body component, a body side wall, integrally formed with the body skin and defining a body mating surface, and a stiffener, integrally formed with the body skin and the body side wall, the stiffener defining a stiffener mating surface, having a stiffener-mating-surface thickness, wherein the stiffener further comprises a boss, comprising a localized portion that has a thickness, which is greater than the stiffener-mating-surface thickness, wherein the body skin and the body side wall together define a cavity, open toward the bottom side of the body component, and wherein the body skin outer surface defines a first aerodynamic surface;

forming a cover component, sized to extend entirely over the cavity of the body component and having a cover mating surface and a cover outer surface, opposite the cover mating surface, the cover outer surface defining a second aerodynamic surface, wherein the cover mating surface of the cover component comprises a socket, sized to receive a part of the boss of the stiffener;

positioning the body component relative to the cover component so that thepart of the boss of the stiffener is inserted into the socket and the body mating surface contacts the cover mating surface, and the cover component encloses the cavity of the body component;

friction stir welding the cover component to the body component so that a friction stir welded joint extends along a portion of the cover mating surface of the cover component and a portion of the body mating surface of the body component; and friction stir welding through the socket of the cover mating surface of the cover component and into the boss of the stiffener of the body component so that an additional friction stir welded joint is formed between the cover mating surface and the stiffener mating surface.

2. The method of claim 1, wherein the additional friction stir welded joint extends along an entire length of the stiffener mating surface of the stiffener.

3. The method of claim 1, further comprising heat treating the body component and the cover component.

4. The method of claim 1, further comprising performing non-destructive inspection of the monolithic aircraft structure.

5. The method of claim 1, further comprising applying at least one surface treatment selected from a group of surface treatments consisting of anodizing, primer coating, and topcoating to the body skin outer surface and the cover outer surface.

6. The method of claim 1, wherein the step of forming the body component comprises machining the body component from a block of aluminum alloy material.

7. The method of claim 1, wherein the step of forming the cover component comprises machining the cover component from a sheet of aluminum alloy material.

8. The method of claim 1, wherein:
the step of forming the body component comprises a step of forming a spoiler body; and
the step of forming the cover component comprises a step of forming a spoiler cover.

9. The method of claim 8, wherein the step of forming the spoiler body comprises forming lugs integrally with the body skin and the body side wall.

10. A monolithic aircraft structure, comprising:
a body component, comprising:
a bottom side;
a body skin having a body skin outer surface opposite the bottom side of the body component, wherein the body skin outer surface defines a first aerodynamic surface;
a body side wall integrally formed with the body skin and defining a body mating surface, wherein the body skin and the body side wall together define a cavity open to the bottom side of the body component; and
a stiffener, integrally formed with the body skin and the body side wall, the stiffener defining a stiffener mating surface, having a stiffener-mating-surface thickness, wherein the stiffener further comprises at least two bosses, wherein each of the at least two bosses comprises a localized portion that has a thickness, which is greater than the stiffener-mating-surface thickness;
a cover component sized to extend entirely over the cavity of the body component and having a cover mating surface and a cover outer surface opposite the cover mating surface, wherein the cover mating surface is shaped conformally with the body mating surface to enclose the cavity of the body component with the cover mating surface in contact with the body mating surface, and wherein the cover outer surface defines a second aerodynamic surface;
a friction stir welded joint, extending through the cover mating surface of the cover component and into the body mating surface, of the body component; and
additional friction stir welded joints, extending through the cover mating surface and into each of the at least two bosses of the stiffener.

11. The monolithic aircraft structure of claim 10, wherein the additional friction stir welded joints extend along an entire length of the stiffener mating surface of the stiffener.

12. An aircraft spoiler, comprising:
a body component, comprising:
a bottom side;
a body skin having a body skin outer surface opposite the bottom side of the body component, wherein the body skin outer surface defines a first aerodynamic surface;
a body side wall integrally formed with the body skin and defining a body mating surface, the body side wall comprising first and second side panels joined by a rear panel, wherein the first and second side panels are generally triangular, and the body skin and the body side wall together define a cavity open to the bottom side of the body component; and
a stiffener, integrally formed with the body skin and the body side wall and located in the cavity of the body component between the first and second side panels to divide the cavity into sub-cavities, the stiffener defining a stiffener mating surface, having a stiffener-mating-surface thickness, wherein the stiffener further comprises at least two bosses, wherein each of the at least two bosses comprises a localized portion that has a thickness, which is greater than the stiffener-mating-surface thickness;
a cover component, sized to extend entirely over the cavity of the body component and having a cover mating surface and a cover outer surface opposite the cover mating surface, wherein the cover mating surface is shaped conformally with the body mating surface and the stiffener mating surface to enclose the sub-cavities and the stiffener of the body component with the cover mating surface in contact with the body mating surface, wherein the cover outer surface defines a second aerodynamic surface;

a friction stir welded joint, extending through the cover mating surface of the cover component and into the body mating surface of the body component; and additional friction stir welded joints, extending through the cover mating surface of the cover component and into each of the at least two bosses of the stiffener.

13. The method of claim 1, wherein the additional friction stir welded joint extends along a portion of a length of the stiffener mating surface of the stiffener.

14. The monolithic aircraft structure of claim 10, wherein each of the additional friction stir welded joints extends along a portion of a length of the stiffener mating surface of the stiffener.

15. The monolithic aircraft structure of claim 10, wherein the body component comprises aluminum alloy material.

16. The monolithic aircraft structure of claim 10, wherein the cover component comprises a sheet of aluminum alloy material.

17. The monolithic aircraft structure of claim 10, wherein:
the body component comprises a spoiler body; and
the cover component comprises a spoiler cover.

18. The aircraft spoiler of claim 12, wherein each of the additional friction stir welded joints extends along an entire length of the stiffener mating surface of the stiffener.

19. The aircraft spoiler of claim 12, wherein each of the additional friction stir welded joints extends along a portion of a length of the stiffener mating surface of the stiffener.

20. The aircraft spoiler of claim 12, wherein:
the body component comprises aluminum alloy material; and
the cover component comprises a sheet of aluminum alloy material.

* * * * *